United States Patent [19]

Iwatsuki et al.

[11] Patent Number: 5,150,296
[45] Date of Patent: Sep. 22, 1992

[54] SHIFT CONTROL SYSTEM AND METHOD FOR AUTOMATIC TRANSMISSION, INCLUDING BOTH A TIMER AND AN INERTIA PHASE START DETECTOR

[75] Inventors: Kunihiro Iwatsuki; Hiromichi Kimura; Hideaki Otsubo, all of Toyota, Japan

[73] Assignee: Toyota Jidosha Kabushiki Kaisha, Toyota, Japan

[21] Appl. No.: 577,576

[22] Filed: Sep. 5, 1990

[30] Foreign Application Priority Data

Sep. 5, 1989 [JP] Japan .................. 1-229638

[51] Int. Cl.⁵ .............................. B60K 41/06
[52] U.S. Cl. .................. 364/424.1; 74/866
[58] Field of Search ............ 364/424.1; 74/866, 867, 74/868, 869

[56] References Cited

U.S. PATENT DOCUMENTS

| | | | |
|---|---|---|---|
| 4,622,866 | 11/1986 | Ito et al. | 74/866 |
| 4,640,393 | 2/1987 | Nishimura et al. | 192/0.052 |
| 4,688,450 | 8/1987 | Hayashi et al. | 74/866 |
| 4,690,017 | 9/1987 | Taniguchi et al. | 74/866 |
| 4,700,591 | 10/1987 | Yasue et al. | 74/866 |
| 4,709,596 | 12/1987 | Boda et al. | 74/868 |
| 4,727,772 | 3/1988 | Sumiya et al. | 74/867 |
| 4,730,519 | 3/1988 | Nakamura et al. | 74/866 |
| 4,789,937 | 12/1988 | Yasue et al. | 364/424.1 |
| 4,790,215 | 12/1988 | Hamano | 74/866 |
| 4,796,490 | 1/1989 | Butts | 74/866 |
| 4,942,530 | 7/1990 | Boda et al. | 364/424.1 |
| 4,955,256 | 9/1990 | Kashihara et al. | 74/866 |
| 4,967,355 | 10/1990 | Iwatsuki et al. | 364/424.1 |
| 4,989,477 | 2/1991 | Hunter et al. | 74/866 |

FOREIGN PATENT DOCUMENTS

57-37140  3/1982  Japan .
62-83541  4/1987  Japan .
62-165050  7/1987  Japan .

Primary Examiner—Parshotam S. Lall
Assistant Examiner—Collin W. Park
Attorney, Agent, or Firm—Oblon, Spivak, McClelland, Maier & Neustadt

[57] ABSTRACT

A shift control system for an automatic transmission includes a first transmission assembly for changing gear ratios in accordance with the release or engagement of a first frictional engagement system and a second transmission assembly connected in series to the first transmission assembly for changing gear ratios in accordance with the engagement or release of a second frictional engagement system. An engagement start instruction generator instructs the start of the engagement of the second frictional engagement system, a timer outputs a signal after the lapse of a predetermined constant time from the instruction of the engagement start of the second frictional engagement system, a detector detects the start of an inertia phase of the second transmission assembly accompanying the engagement start of the frictional engagement system from the rotary state of a rotary member in either of the first or second transmission assemblies, to output a detection signal, and a release start instructing generator instructs the start of the release of the first frictional engagement system simultaneously with either the output of the signal from the timer or the output of the signal from the detector.

4 Claims, 7 Drawing Sheets

| P.N | C1 | C2 | C0 | B0 | B1 | B2 | B3 | 2ND TRANSMISSION ASSEMBLY | 1ST TRANSMISSION ASSEMBLY |
|---|---|---|---|---|---|---|---|---|---|
| R |  | O | O |  |  |  | O | LOW | RW |
| 1 | O |  | O |  |  |  | X | LOW | 1ST SPEED |
| 2 | O |  |  | O |  |  | X | HIGH | 1ST SPEED |
| 3 | O |  | O |  | X | O |  | LOW | 2ND SPEED |
| 4 | O |  |  | O | X | O |  | HIGH | 2ND SPEED |
| 5 | O | O | O |  |  | O |  | LOW | 3RD SPEED |
| 6 | O | O |  | O |  | O |  | HIGH | 3RD SPEED |

SHIFT CONTROL SYSTEM AND METHOD FOR AUTOMATIC TRANSMISSION, INCLUDING BOTH A TIMER AND AN INERTIA PHASE START DETECTOR

BACKGROUND OF THE INVENTION

1. Field of the Invention

The present invention relates to a system for controlling the gear changes of a vehicular automatic transmission and a method for executing the gear changes. More specifically, the present invention relates not only to a shift control system for an automatic transmission including series-connected first and second transmission assemblies, so that a downshift of the transmission may be achieved as a whole by simultaneously accomplishing a downshift for augmenting the gear ratio at the first transmission assembly and an upshift for reducing the gear ratio at the second transmission assembly, but also to a method for executing such shifts.

2. Discussion of the Background

In accordance with the rapid spread of the vehicular automatic transmission in recent years, there has been widely adopted, with a view to improving fuel consumption, a so-called "overdrive mechanism" having a gear ratio less than "1" which is connected as a second transmission assembly in series to a first transmission assembly capable of switching gear ratios automatically in relation to the running velocity and throttle opening of the vehicle.

In Japanese Patent Laid-Open No. 57-37140, there is disclosed an automatic transmission which is constructed to achieve six forward gear ratios by synchronizing the second transmission assembly or the overdrive mechanism positively with the shift of the first transmission assembly which is capable of achieving three forward gear ratios to shift the first and second transmission assemblies simultaneously or alternately. This automatic transmission is constructed to realize multiple gear ratios easily by setting the first transmission assembly at one of first to third speeds for each of the high and low-gear ratios of the second transmission assembly. In addition, the automatic transmission can achieve a number of advantages such as improvements in the fuel consumption and running performance and reductions in the loads upon frictional engagement means.

In this automatic transmission, however, the gear changes are performed by augmenting the gear ratio at the first transmission assembly and reducing the gear ratio at the second transmission assembly in the case of a downshift from the third to second speeds or from the fifth to fourth speeds. In other words, the gear changes are achieved by shifting the first and second transmission assemblies in the opposite directions to each other. If the gear changes, i.e., the shifts at the individual transmission assemblies were individually controlled in the case of such a downshift, the shifts could not be timed to augment shifting shocks. Another disadvantage would be an extraordinary drive feel which might otherwise be invited by a phenomenon that an upshift is caused at the second transmission assembly after a downshift at the first transmission assembly or vice versa.

On the other hand, we have revealed in Japanese Patent Laid-Open No. 62-165050 that excellent shifting characteristics can be obtained by starting and completing the substantial shift of the second transmission assembly during the substantial shift of the first transmission assembly. The substantial shift, as herein termed, is the period for which rotary members have their rotational frequency changed due to the shift, and is generally called the "inertia phase". Specifically, we have revealed in our Laid-Open specification that the start of the shift at the second transmission assembly should not occur before the start of the inertia phase of the first transmission assembly and that the end of the shift at the second transmission assembly should not occur after the end of the inertia phase of the first transmission assembly.

Let the case of a shift now be examined, in which the automatic transmission is to be shifted down in its entirety by performing a downshift for augmenting the gear ratio at the first transmission assembly and an upshift for reducing the gear ratio at the second transmission assembly. In this case, a timer is used to start the inertia phase of the second transmission assembly after the start of the inertia phase of the first transmission assembly. Generally speaking, the downshift has a smaller time lag from the output of a shift command to the actual start of the shift (i.e., the inertia phase) because it is achieved by releasing the frictional engagement means, whereas the upshift has a larger time lag from the output of the shift command to the start of the inertia phase because it is achieved by engaging the frictional engagement means. Thus, the timer is used for reflecting those time differences upon the shift controls. In case such a timer is used, the shift control system is constructed to output the upshift command having the larger time lag and then outputs the downshift command after a constant time has been counted by the timer. As a result, the inertia phase of the upshift is started immediately after the inertia phase of the downshift has been actually started.

In order to engage or release the aforementioned frictional engagement means, an oil pressure is generally used but will be inevitably disordered to cause failures of the timings for the gear changes. In case the oil pressure grows excessively high, for example, the frictional engagement means is prematurely engaged to advance the timing for the upshift to reduce the gear ratio and is released late, to retard the timing for the downshift to augment the gear ratio. On the other hand, a contrary phenomenon is invited in the case where the oil pressure drops. Thus, the timings for the upshift and downshift are highly displaced relative to each other no matter whether the oil pressure might be disordered to a high or low level.

Since, on the other hand, the engine torque to be inputted to the automatic transmission will inevitably fluctuate even for a constant throttle opening, the gear changing timings may be displaced. If the intake air temperature drops, for example, the engine has an increased output torque even for the constant throttle opening. In this case, a delay is liable to occur in the upshift to be achieved by engaging the frictional engagement means.

Moreover, the discrepancy in the lengths of the piston strokes of a hydraulic serve acting as an actuator for engaging or releasing the frictional engagement means will exert serious influences upon the discrepancy of the engaging timing of the frictional engagement means.

Even if, therefore, the shifting timings of the first and second transmission assemblies are to be controlled by the timer, their discrepancy is influenced in various manners by the aforementioned oil pressure or engine torque so that the optimizations of the two timings are restricted as a matter of course. In case the shifting timings are controlled exclusively by the timer, the aforementioned extraordinary shift feel may possibly occur to the driver if the dispersion of the oil pressure is serious.

SUMMARY OF THE INVENTION

Accordingly, an object of the present invention is to provide a novel system to optimize the gear changes of an automatic transmission in its entirety by controlling the shifting timings of first and second transmission assemblies on the basis of the time and the start of the inertia phase of the second transmission assembly in case the automatic transmission is shifted in a direction identical as a whole to that of the shift direction of the first transmission assembly by shifting the first and second transmission assemblies in opposite directions to each other.

Another object of the present invention is to optimize the gear changes of the automatic transmission in its entirety by instructing (commanding) the shift due to the release of the frictional engagement means of the second transmission assembly after the instruction (command) of the shift of the second transmission assembly and simultaneously with the earlier one of the start of the inertia phase of the second transmission assembly and the lapse of a predetermined time in case the automatic transmission is shifted in the direction identical as a whole to that of the shift direction of the first transmission assembly by releasing the frictional engagement means of the first transmission assembly and engaging the frictional engagement means of the second transmission assembly to shift the individual transmission assemblies in opposite directions to each other.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
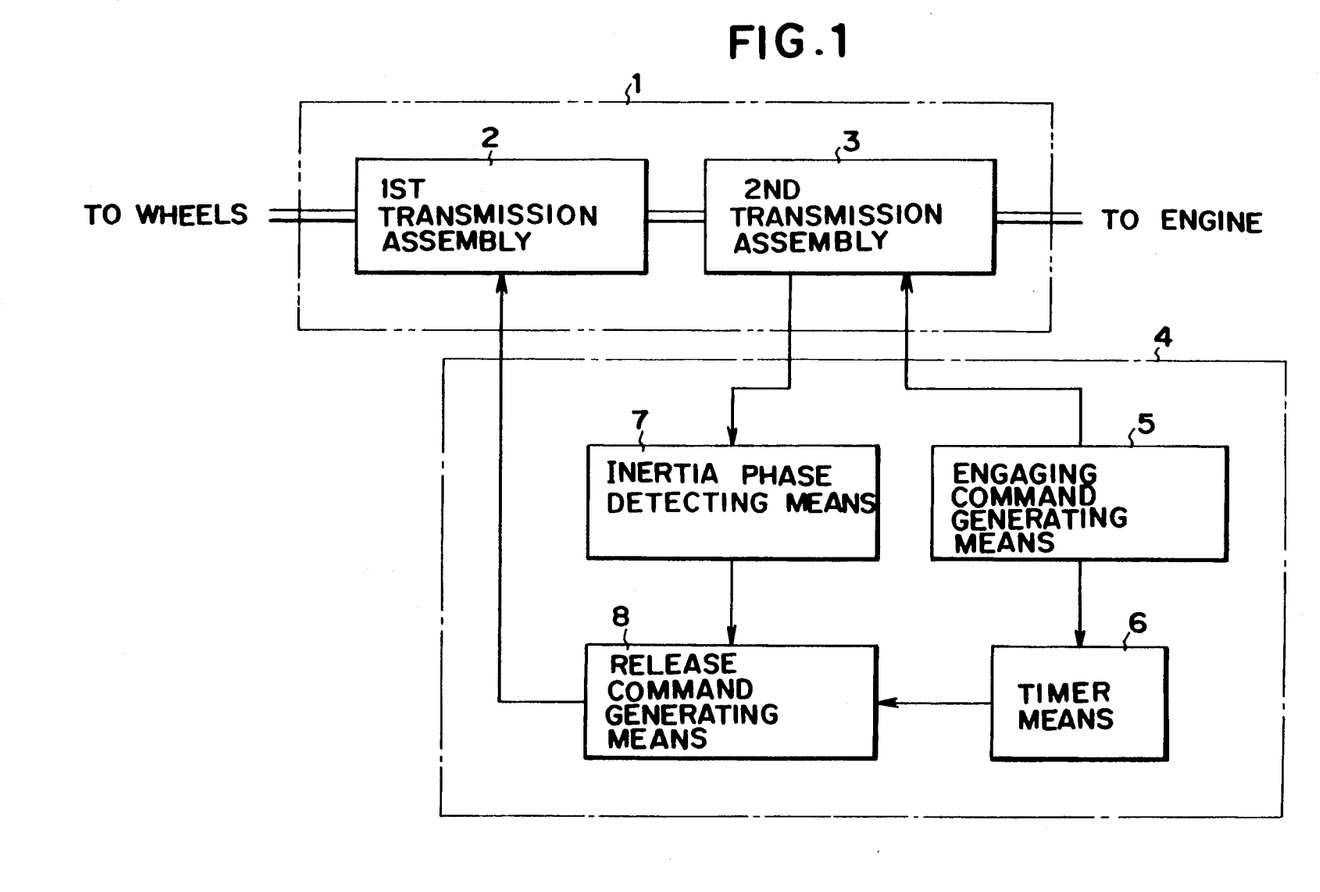
FIG. 1 is a block diagram showing the gist of the present invention.

Referring now to the drawings, wherein like reference numerals designate identical or corresponding parts throughout the several views, and more particularly to FIG. 1 thereof, where a basic structure of the present invention is detailed. In FIG. 1, an automatic transmission 1 is composed of a first transmission assembly 2 having gear ratios of relatively wide intervals and a second transmission assembly 3 having gear ratios of relatively close intervals. These transmission assemblies 2 and 3 are constructed to have their gear ratios changed, respectively, by engaging or releasing friction engagement means and are connected in series to each other. Moreover, the gear ratios of the automatic transmission 1 to be set are decided on the basis of the vehicular running velocity, the engine load and other data. These gear ratios are controlled by a control device 4 which is composed of engagement command generating means 5 for instructing the start of the engagement of the frictional engagement means of the second transmission assembly 3; timer means 6 for outputting a signal by starting or ending its counting operations of a predetermined time simultaneously with the output of the signal of the engagement command generating means 5; inertia phase detecting means 7 for detecting the start of the inertia phase of the second transmission assembly 3; and release command generating means 8 for outputting a release signal to the frictional engagement means of the first transmission assembly 2 so as to shift the first transmission assembly 2.

As a result, when the downshift for augmenting the gear ratio of the first transmission assembly 2 and the upshift for reducing the gear ratio of the second transmission assembly 3 are performed in accordance with the changes in the vehicular running velocity and the engine load to shift down the automatic transmission as a whole, the signal is outputted from the engagement command generating means 5 to engage the frictional engagement means of the second transmission assembly 3. Simultaneously with this, the timer means 6 starts its time counting operations. When the engagement of the frictional engagement means of the second transmission assembly 3 advances to bring the rotary state of the second transmission assembly 3 into the inertia phase, the inertia phase detecting means 7 outputs its signal, and the release command generating means 8 accordingly outputs its signal so that the release of the frictional engagement means of the first transmission assembly 2 is started.

Figure 7:
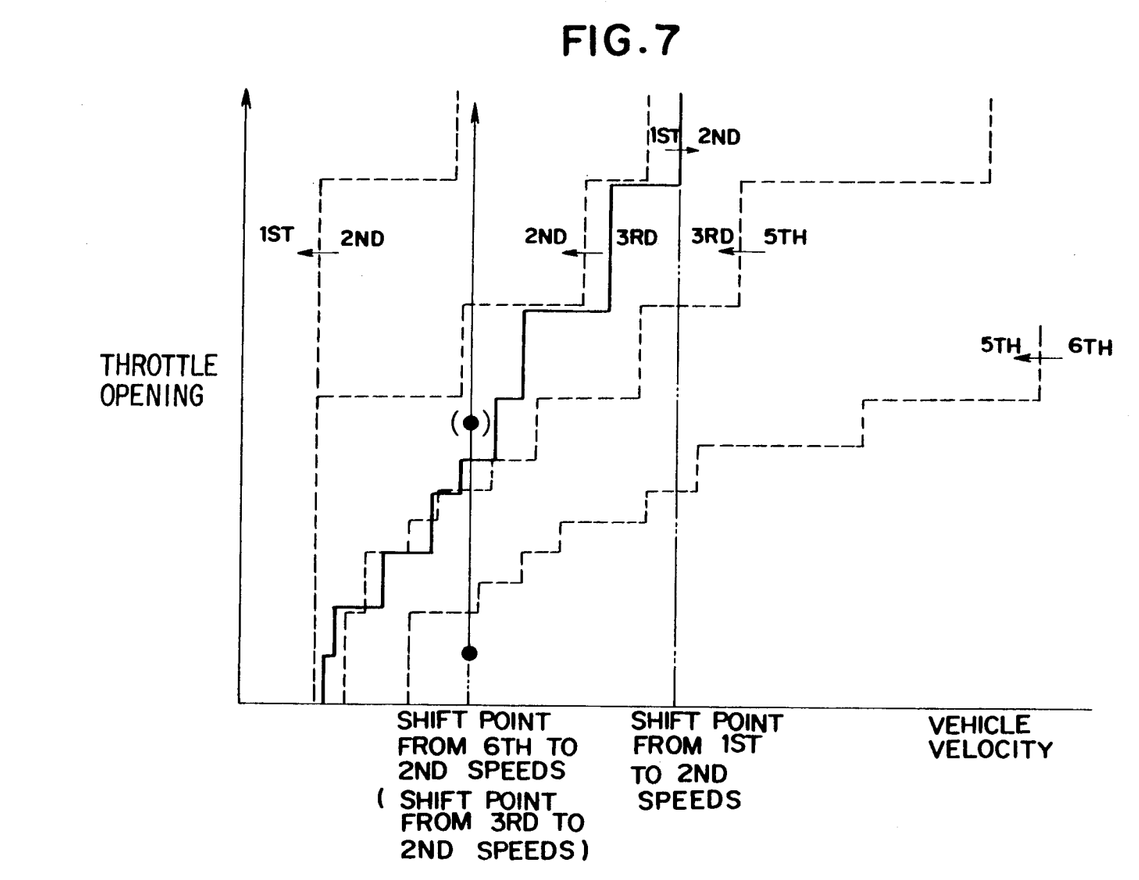
FIG. 7 is a diagram showing one example of a shift map.

Incidentally, the frictional engagement means of the second transmission assembly 3 may be engaged in either the cases of an overall downshift or upshift of the automatic transmission 1. In the automatic transmission having a later-described structure shown in FIG. 2, for example, the frictional engagement means of the second transmission assembly 3 is engaged to shift the second transmission assembly to the high gear no matter whether the automatic transmission might be shifted down from the third to second speeds or up from the first to second speeds. Of these shifts, the downshift from the third to second speeds may have its shift point located in a far lower position, as exemplified in FIG. 7, than that of the upshift from the first to second speeds. If the shift point is dropped to such a low level, generally speaking, the increment of the torque exerts high influences upon the torque converter to increase the input torque of the automatic transmission to a considerably high level. As a result, if the oil pressures for engaging the frictional engagement means are equal for the cases of the two gear changes, there arises an intense trend that the upshift of the second transmission assembly is delayed in the case of the downshift from the third to second speeds. In the system of the present invention shown in FIG. 1, therefore, whether or not a predetermined time has elapsed is monitored by starting the time counting operations by the timer means 5 simultaneously with the upshift command of the second transmission assembly 3, i.e., the output of the signal of the engagement command generating means 5. If it is not detected even after a lapse of the predetermined time that the inertia phase accompanying the upshift of the second transmission assembly 3 is started, that is, if the timer means 6 has completed the counting of the predetermined time, the release command generating means 8 outputs its signal to command the downshift of the first transmission assembly 2.

When the downshift of the first transmission assembly 2 is executed, the advance of the upshift of the second transmission assembly 3 is accordingly accelerated so that the gear change of the second transmission assembly 3 is not left continuous so long after the downshift of the first transmission assembly 2.

According to the system shown in FIG. 1, therefore, it is possible even with a variety of dispersions in the oil pressure or the like to prevent any serious discrepancy between the starts of the inertia phases accompanying the upshift and downshift. This in turn prevents any serious shifting shocks and extraordinary shift feel. Since, moreover, the time required for the shift is not elongated, it is further possible to prevent any deterioration of the frictional engagement means.

According to the system of the present invention, the command of the downshift is outputted after the start of the inertia phase accompanying the upshift has been detected. In the obtainable state, therefore, the upshift is as it were executed for a short time at the beginning of the start of the gear change although the automatic transmission is shifted down in its entirety. Since, however, there is little time lag in the downshift accompanying the upshift, any serious disadvantage will not be caused even in a temporary state similar to that of the upshift.

In other words, the present invention has been conceived by finding out that such an advantage in the gear changes that the individual timings for starting the upshift and downshift are prevented thanks to the aforementioned controls from being moved even with a variety of large dispersions while allowing the aforementioned slight upshift state.

According to the present invention, moreover, the determination of the timing for starting the inertia phase of the second transmission assembly 3 by means of the timer can be completed to prevent any increase in the shifting time.

Here, the control system of the present invention can be applied to an automatic transmission which is shifted in the direction identical as a whole to that of the first transmission assembly by releasing the frictional engagement means of the first transmission assembly to shift the latter and by engaging the frictional engagement means of the second transmission assembly having smaller intervals of gear ratios than those of the first transmission assembly to shift the second transmission assembly in the opposite direction to that of the first transmission assembly.

Figure 2:
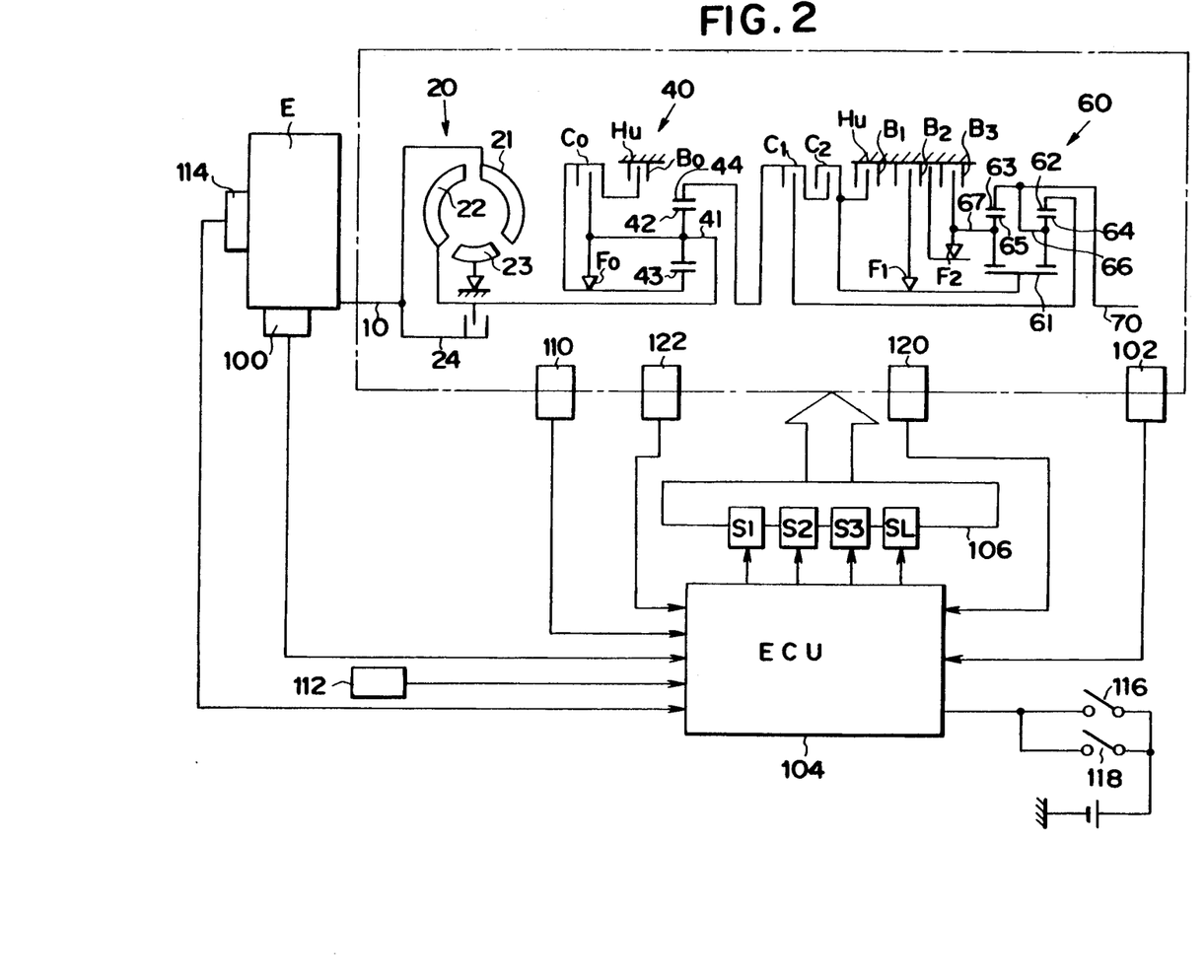
FIG. 2 is a skeleton diagram showing an automatic transmission according to an embodiment of the present invention.

A more specified structure of the present invention is shown in FIG. 2. The automatic transmission, as shown, is equipped as its shift mechanism with a torque converter 20, a second transmission assembly 40 and a first transmission assembly 60 for effecting three-forward and one-reverse gear changes.

The torque converter 20 is equipped with a pump impeller 21, a turbine runner 22, a stator 23 and a lockup clutch 24. The pump impeller 21 is connected to the crankshaft 10 of an engine E, and the turbine runner 22 is connected to the carrier 41 of a planetary gear set in the second transmission assembly 40.

In this second transmission assembly 40, a pinion gear 42 held rotatably by the carrier 41 meshes with a sun gear 43 and a ring gear 44. Moreover, a clutch CO and a one-way clutch FO are interposed between the sun gear 43 and the carrier 41, and a brake BO is interposed between the sun gear 43 and a housing Hu.

The first transmission assembly 60 is equipped with two front and rear planetary gear sets. These planetary gear sets share a sun gear 61 and are equipped, respectively, with pinion gears 64 and 65 for meshing with the common sun gear 61, carriers 66 and 67 for holding the pinion gears 64 and 65, and ring gears 62 and 63 for meshing with the pinion gears 64 and 65.

The ring gear 44 of the second transmission assembly 40 is connected through a clutch C1 to the aforementioned ring gear 62. Another clutch C2 is interposed between the ring gear 44 and the sun gear 61. Moreover, the aforementioned carrier 66 and ring gear 63 are connected to each other and together to an output shaft 70. Between the aforementioned carrier 67 and housing Hu, on the other hand, there are interposed a brake B3 and a one-way clutch F2. Moreover, a brake B2 is interposed through another one-way clutch F1 between the sun gear 61 and the housing Hu, and a brake B1 is interposed between the sun gear 61 and the housing Hu.

Figure 3:
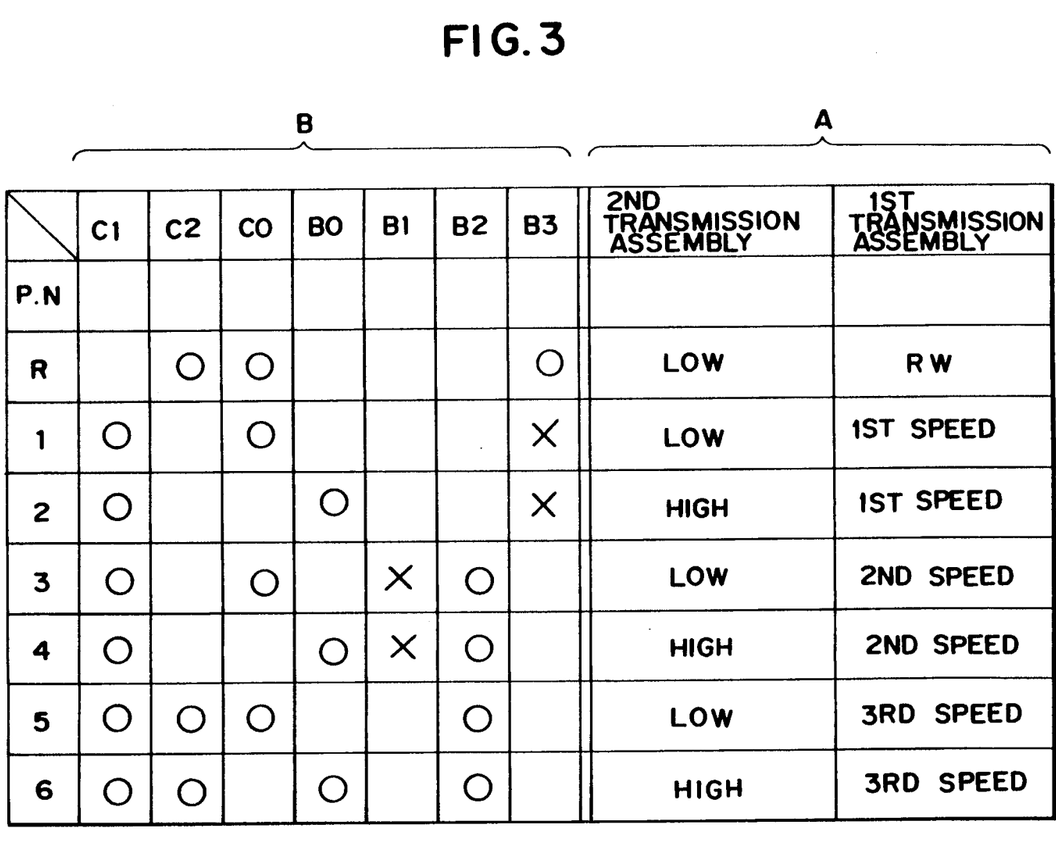
FIG. 3 presents a chart showing the engaged and released states of frictional engagement means for setting the individual gear ratios at the automatic transmission shown in FIG. 2.
Figure 4:
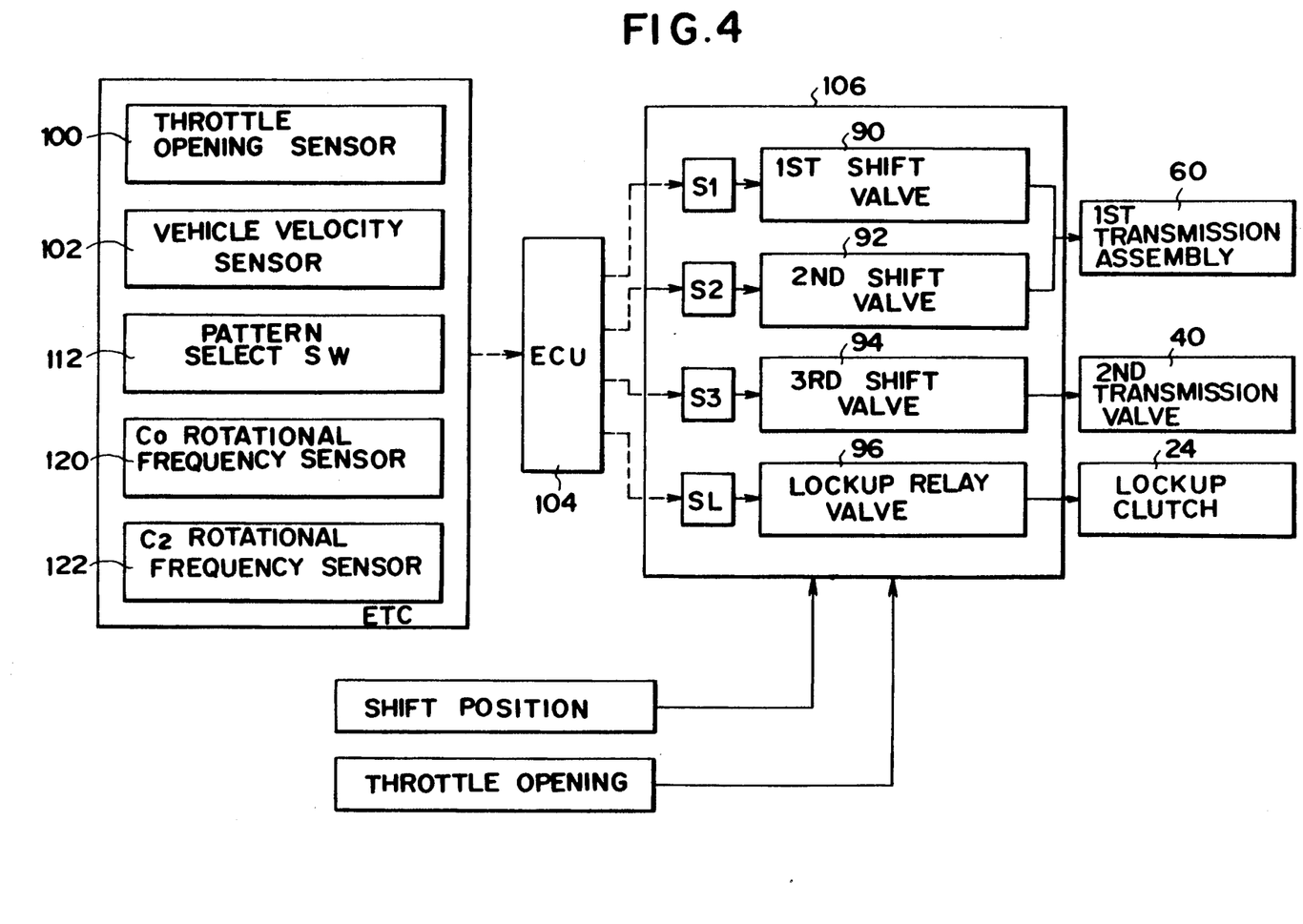
FIG. 4 is a block diagram for explaining the transmission systems of control signals of the automatic transmission shown in FIG. 2.

The automatic transmission is equipped with the shift mechanism thus far described and has its individual clutches and brakes engaged and/or released, as presented at the column B in FIG. 3, to perform the shift control. This shift control is effected by controlling solenoid valves S1 to S3 and SL in an oil pressure control circuit 106 in accordance with a preset shift pattern, by means of an electronical control unit (ECU) 104 which is made to receive the signals of a throttle opening sensor 100 for detecting a throttle opening $\theta$ representative of a load state of the engine E and a vehicular velocity sensor 102 for detecting the output shaft rotational frequency NO in terms of the running velocity of the vehicle, as shown in FIG. 4. In the clutch and brake application chart of FIG. 3: symbols O indicate the engaged state; symbols X indicate the engaged state to be taken only at the time of engine braking; and blanks indicate the released state.

In the automatic transmission of this type, as can be apparently seen from the column A in FIG. 3, at the time of a downshift from 3rd to 2nd speeds or from fifth to fourth speeds, the gear ratio at the second transmission assembly 40 is reduced whereas the gear ratio at the first transmission assembly 60 is increased so that the automatic transmission may be shifted down in its entirety. Hence, these gear changes will correspond to those which form the subject of the present invention.

The aforementioned solenoid valves S1 and S2 control the first and second shift valves 90 and 92, respectively, of the first transmission assembly 60, as shown in FIG. 4. The solenoid valve S3 controls a third shift valve 94 for shifting the second transmission assembly 40 from high to low gears. On the other hand, the solenoid valve SL controls a lockup relay valve 96.

Incidentally, the specific structures and operations of the individual devices themselves in the oil pressure control circuit are not especially different from those of the prior art.

In FIGS. 2 or 4, reference numeral 110 designates a shift position sensor for detecting such positions including the neutral range (N), the drive range (D) or the reverse range (R), as is selected by the driver. Numeral 112 designates a pattern select switch for selecting one of shift patterns including the economy mode (E) and the power mode (P). Moreover, numeral 114 designates a water temperature sensor for detecting the temperature of the cooling water of the engine E. Numeral 116 designates a brake switch for detecting the depression of the foot brake. Numeral 118 designates a brake switch for detecting the pull of the side brake. As shown in FIG. 4, moreover, the oil pressure in the oil pressure control circuit 106 is changed according to the shift position and the throttle opening.

To the aforementioned central processing unit 104, there are also connected a rotational frequency sensor 120 for detecting the r.p.m. of the clutch C2 and a rotational frequency sensor 122 for detecting the r.p.m. of the clutch CO. Thus, a signal Nc2 according to the r.p.m. of the clutch C2 and a signal NcO according to the r.p.m. of the clutch CO are inputted to the central processing unit 104.

Figure 5:
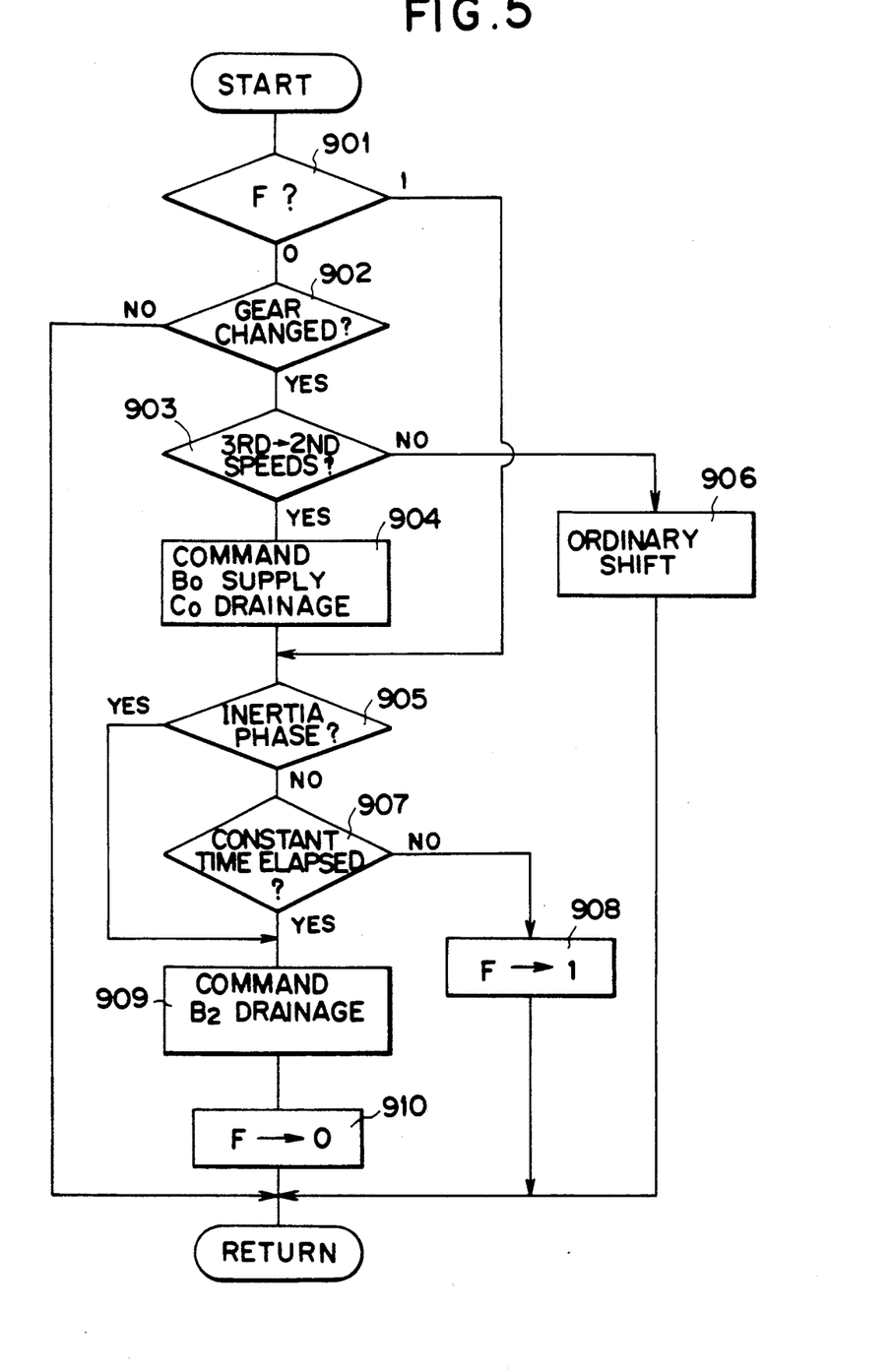
FIG. 5 is a flow chart showing an example of the control procedures in the automatic transmission shown in FIG. 2.

The flow chart of FIG. 5 illustrates the procedure of the control in the case of a gear change from the third to second speeds.

At a first Step 901, the value of a flag F is decided. This flag F implies that the procedure is in the course of the gear change from the third to second speeds, if it is set at "1". First of all, the flag F is reset at "0" so that the procedure advances to Step 902 after the first decision of Step 901.

At Step 902, it is decided on the basis of the throttle opening $\theta$ and the output shaft rotational frequency NO of the automatic transmission whether or not the gear change is to be accomplished. If "NO", the procedure will go to RETURN.

If it is decided that the gear shift is to be performed, the procedure advances to Step 903, at which point it is decided whether or not the gear change to be executed is the downshift from the third to second speeds. If the decision result is "NO", the procedure advances to Step 906, at which point a control for an ordinary shift is performed. If the decision result at Step 903 is "YES", on the other hand, the procedure advances to Step 904, at which point the oil pressure is supplied to the brake BO and drained from the clutch CO. In other words, a command signal for the upshift of the second transmission assembly 40 is outputted.

At subsequent Step 905, it is decided whether or not the inertia phase for the upshift of the second transmission assembly 40 has been started. A specific method for detecting the start of that inertia phase can be exemplified in the following manner. According to this method, the following three rotational frequencies are detected: the rotational frequency NcO of the clutch CO or the sun gear 43 of the second transmission assembly 40; the rotational frequency Nc2 of the clutch C2; and the rotational frequency NO of the output shaft. From these values, the rotational frequency Nc1 of the clutch C1 can be computed by the following Equation (1), and it can be decided whether or not the following Inequality (2) holds:

$$Nc1 = (1+\rho)NO - \rho Nc2 \qquad (1);$$

and $$NcO < Nc1 - \Delta N \qquad (2),$$

wherein:

$\Delta N$: a constant created to eliminate mainly the influences of the errors of the sensor system; and $\rho$: the ratio of the tooth numbers of the sun gear 61 and the ring gear 62 of the first transmission assembly 60.

If the inertia phase has not started, the decision result at Step 905 is "NO" so that the procedure advances to Step 907, at which point it is decided whether or not a predetermined constant time has elapsed from the time of the output of the command signal at Step 904. If this decision result is "NO", it is meant that the inertia phase at the second transmission assembly 40 has not been started and that the constant time has not elapsed from the shifting command. In this case, the procedure advances to Step 908, at which the flag F is set at "1", and the procedure goes to RETURN. As a result, the decision result at Step 901 after RETURN is at "1". In this case, the procedure instantly advances to Step 905, at which point it is decided again whether or not the inertia phase has been started. If the decision result is "YES" as a result of the start of the inertia phase, the procedure advances to Step 909, at which point the drain command for releasing the brake B2, i.e., the command signal for the downshift of the first transmission assembly 60 is outputted.

Even if, on the other hand, the decision result at Step 905 is "NO" as a result of the inertia phase not having started, the decision result at Step 907 is "YES" after the lapse of the constant time from the output of the shifting command at Step 904. In this case, too, the procedure advances to Step 909, at which point the command signal for the downshift of the first transmission assembly 60 is outputted.

After the drain command of the brake B2 has been outputted at Step 909, the flag F is reset to "0" at Step 910, and the procedure advances to RETURN.

According to the controls thus far described, therefore, after the command signal for the upshift of the second transmission assembly 40 has been outputted, the second transmission assembly 40 comes into the inertia phase. Simultaneously with this, the command signal for the downshift of the first transmission assembly 60 is outputted. This reduces the discrepancy, if any, between the starting timings of the inertia phases of the first and second transmission assemblies 60 and 40 even with a variety of dispersions of the oil pressure and so on.

Even in case the inertia phase of the second transmission assembly 40 hesitates to start after the output of the shift command, the command signal for the downshift of the first transmission assembly 60 is outputted after the lapse of the constant time from the shift command, so that the responsiveness of the gear change is not deteriorated.

Next, the changes in the revolving speed of the rotary member, the torque and the oil pressure in the shifting procedure will be described with reference to FIG. 6 so as to clarify the effects to be obtained by the present invention. Incidentally, the following description will take up as the most effective example of the case in which the gear change decisions from the fifth to second speeds are continuously made while the vehicle is running at the sixth speed.

The shifting responsiveness has to be taken into account in case the accelerator pedal is deeply depressed while the automatic transmission is at the sixth or fifth speed. As seen from the shift diagram of FIG. 7, the aforementioned continuous shift decisions are made very frequently in case the accelerator pedal is deeply depressed.

Figure 6:
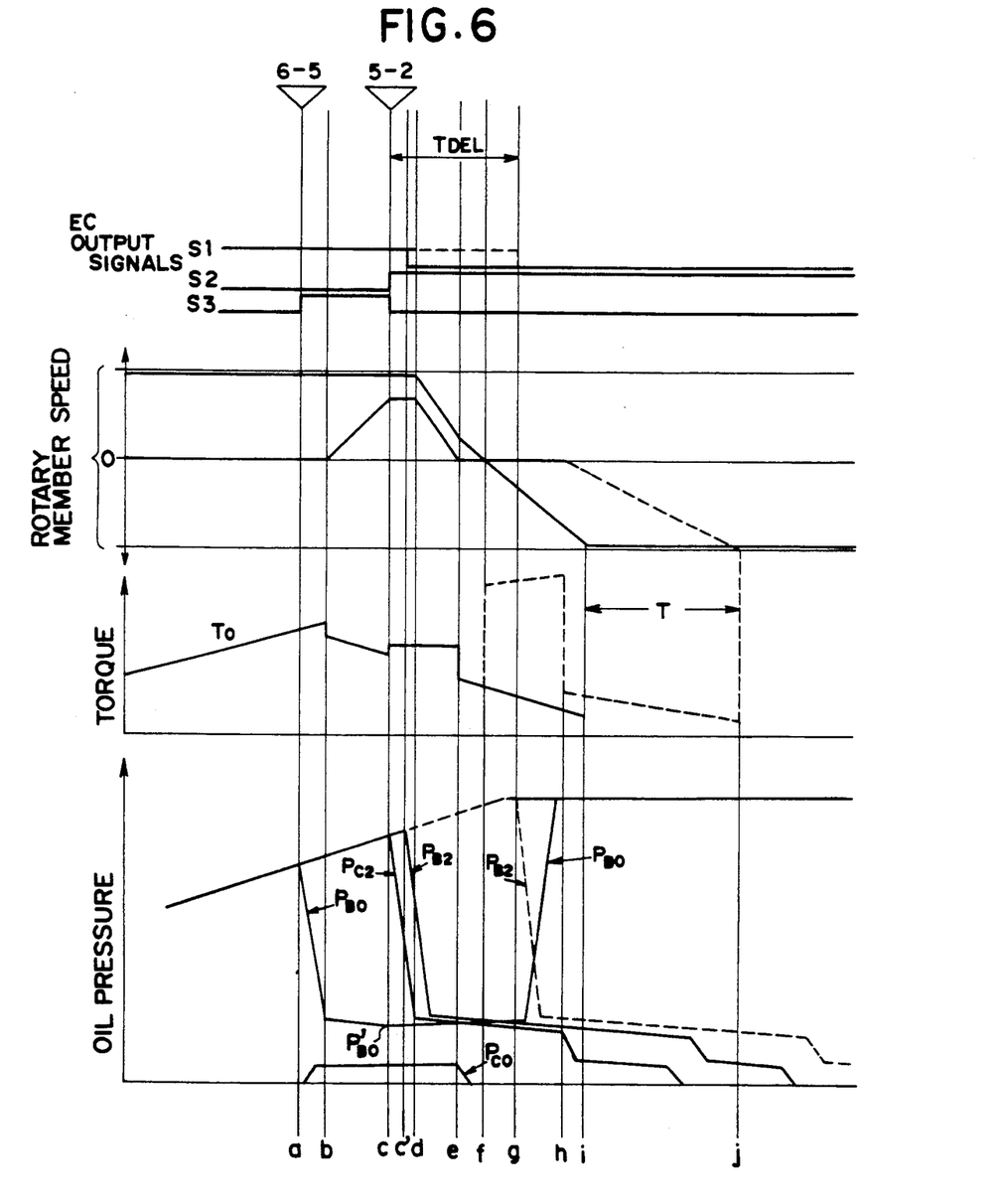
FIG. 6 is a diagram showing the shift transit characteristics of the embodiment of the present invention.

When the state for effecting the gear change from the sixth to fifth speeds is matured by depressing the accelerator pedal at instant a, as shown in FIG. 6, the signal for draining the oil pressure from the brake BO and supplying the oil pressure to the clutch CO is outputted. From instant b, the brake BO is gradually released to begin slipping. At instant c, the shift decision from the fifth to second speeds is made to output the individual command signals for supplying the oil pressure to the brake BO, draining the oil pressure from the clutch CO and draining the oil pressure to the clutch C2. The oil pressure PBO in the brake BO is at a relatively high level (PBO') because it is not completely drained yet. On the other hand, the oil pressure Pc2 in the clutch C2 is drained to begin slipping from instant d. Since this slip is effective to drop the revolving speed of the brake BO, it aids in engaging the brake BO to promote the upshift of the second transmission assembly 40.

Thus, the engagement of the brake BO in the second transmission assembly 40 advances to end the upshift of the second transmission assembly 40 at instant e.

In the shift control of the prior art, on the contrary, the signal for draining the oil pressure from the brake B2 is outputted at an instant (as indicated at point g) when a time designated at TDEL in FIG. 6 elapses after the shift command from the fifth to second speeds has been outputted. When the downshift (i.e., the shift from the third to second speeds, as shown in FIG. 3) in the first transmission assembly 60 is ended at instant f, the output shaft torque is temporarily augmented, as indicated by the broken line in FIG. 6. After this, the downshift of the first transmission assembly 60 from the second to first speeds is started from instant g and is ended at instant j.

According to the control method using the system shown in FIG. 2, on the contrary, the drain command signal for the brake B2 is outputted in response to the earlier one of the start of the inertia phase of the second transmission assembly 40 or the end of the counting operation of the predetermined time by the timer. As a result, the drain command is outputted at the considerably earlier instant c' than the point g of the conventional system. This advance of timing comes from the fact that the foregoing Inequality (2) holds at instant c' to cause the decision of the start of the inertia phase. As a result, the shift ends at instant i as a whole so that the responsiveness is improved to the time, as indicated at T in FIG. 6, as compared with the control based upon the output signal of the timer.

If, on the other hand, the output of the drain signal for the brake B2 is controlled in response to only the start of the inertia phase of the second transmission assembly 40, the following disadvantages will arise. As is apparent from the shift diagram of FIG. 7, the downshift from the third to second speeds even with the engagement of the brake BO may have a far lower shift point than that of the upshift from the first to second speeds. In the case of a low shift point, generally speaking, the torque amplification by the torque converter is highly influential to increase the torque to be inputted to the automatic transmission, so that the shift time is elongated unless the oil pressure is changed. If, therefore, the command signal for the downshift of the first transmission assembly 60 is outputted at the start of the inertia phase of the second transmission assembly 40, the start of the inertia phase of the second transmission assembly 40 is delayed due to the downshift point so that the whole shifting operation is accordingly delayed.

In order to eliminate this disadvantage, it is conceivable to raise the oil pressure for executing the downshift from the third to second speeds thereby to advance the start of the inertia phase in the second transmission assembly 40. At the time of a shift other than that from the third to second speeds, however, the shifting shocks grow serious if the oil pressure is at a high level. Thus, the oil pressure for the brake BO has to be different for the cases of the shifts from the third to second speeds and from the first to second speeds which results in an oil pressure circuit that is complicated.

In the system of the present invention, on the contrary, the command signal for the downshift of the first transmission assembly 60 is outputted after the lapse of the constant time in case the start of the inertia phase of the second transmission assembly 40 is delayed. As a result, the system can avoid a delay of the whole shift without any change in the oil pressure, while keeping the oil pressure circuit away from any increased complication.

The major effects to be obtained by the system and method of the present invention will be summarized as follows. When the gear ratio of the first transmission assembly and the gear ratio of the second transmission assembly in the opposite direction to that of the first transmission assembly are to be changed to change the gear ratio in the direction identical as a whole to that of the first transmission assembly, it is possible to prevent the shift timing at each transmission assembly from any large discrepancy and the time period for completing the whole shift from any elongation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shift control system for an automatic transmission comprising:
a first transmission assembly comprising means for changing gear ratios therein in accordance with a release or engagement of a first frictional engagement means;
a second transmission assembly connected in series to said first transmission assembly and comprising means for changing gear ratios therein in accordance with an engagement or release of a second frictional engagement means, the second transmission assembly having intervals of gear ratios which are narrower than intervals of the gear ratios of said first transmission assembly, so that a change in the gear ratios of said first transmission assembly by the release of said first frictional engagement means and the change in the gear ratios of said second transmission assembly in an opposite direction to that of said first transmission assembly by the engagement of said second frictional engagement means may be simultaneously accomplished to execute a change in the gear ratio in the transmission as a whole in a direction identical to that of said first transmission assembly;

engagement start commanding means for commanding a start of the engagement of said second frictional engagement means;

timer means for outputting a timer signal after a lapse of a predetermined constant time from the engagement start command from said second frictional engagement means;

detection means for detecting a start of an inertia phase of said second transmission assembly accompanying the engagement start of said second frictional engagement means, from a rotary state of a rotary member in either of said first or second transmission assemblies, to thereby output a detection signal; and release start commanding means for commanding a start of the release of said first frictional engagement means simultaneously with the first of the timer signal from said timer means and the detection signal from said detection means.

2. A shift control system for an automatic transmission according to claim 1, wherein said detecting means detects the start of said inertia phase by computations based on the number of revolutions of a plurality of rotary members.

3. A shift control system for an automatic transmission according to claim 1, wherein said first transmission assembly includes a gear train having its gear ratio increased by releasing said first frictional engagement means, and wherein said second transmission assembly includes a gear train having its gear ratio decreased by engaging said second frictional engagement means.

4. A method for controlling the shifting of an automatic transmission, wherein said automatic transmission includes a first transmission assembly for changing gear ratios in accordance with a release or engagement of a first frictional engagement means and a second transmission assembly connected in series with said first transmission assembly for changing gear ratios in accordance with an engagement or release of a second frictional engagement means such that intervals of said gear ratios of said second transmission assembly are narrower than those of the gear ratios of said first transmission assembly, comprising the steps of:

controlling a gear ratio change of the transmission as a whole in a direction identical to that of said first transmission assembly by simultaneously accomplishing a change in the gear ratios of said first transmission assembly by releasing said first frictional engagement means and accomplishing a change in the gear ratios of said second transmission assembly in an opposite direction to that of said first transmission assembly by engaging said second frictional engagement means;

starting the engagement of said second frictional engagement means; and starting the release of said first frictional engagement means at an earlier one of a start of an inertia phase of said second transmission assembly and a lapse of a predetermined constant time from a start of the engagement of said second frictional engagement means.

* * * * *